3,322,816
PROCESS FOR PREPARING DICYANO-
ACETYLENE
Engelbert Ciganek, Chadds Ford, Pa., and John R. Roland, Wilmington, Del., assignors to E. I. du Pont de Nemours and Company, Wilmington, Del., a corporation of Delaware
No Drawing. Filed Nov. 16, 1964, Ser. No. 411,604
6 Claims. (Cl. 260—465.8)

This invention relates to a new process for preparing dicyanoacetylene.

Dicyanoacetylene is a valuable chemical. It is useful, for example, as a high temperature fuel, as its mixtures with ozone give flame temperatures of more than 6000° K., the highest known [Kirschenbaum and V. Grosse, J. Am. Chem. Soc., 78, 2020 (1956)]. It is further useful in the preparation of chemical derivatives. Thus, by reaction with cyclopentadiene, it forms a 1:1 adduct which is a control agent for the silk worm and the Colorado potato beetle [Blomquist and Winslow, J. Org. Chem., 10, 149 (1945)].

Until recently, the only known method of preparing dicyanoacetylene was that of Moureu and Bongrand [Ann. Chim., 14, 5 (1920)], which consists in dehydrating acetylenedicarboxamide by means of phosphoric anhydride. This method is uneconomical and cannot be scaled up to give more than very small quantities of reaction product at one time. A more recent method is that described in U.S. Patent 3,070,622 to E. L. Martin, which consists in pyrolyzing 1,2-dichloro-1,2-dicyanoethylene. This is a much more satisfactory process, but it is not free of disadvantages in that the by-product chlorine readds to the dicyanoacetylene and, unless it is removed promptly from the reaction product by various chemical or physical means, the conversions are low.

It has now been found that dicyanoacetylene can be prepared in good conversions and yields by a simple pyrolysis process in which the by-products are essentially unreactive toward dicyanoacetylene.

In accordance with this invention, dicyanoacetylene is prepared by pyrolyzing in the vapor phase a compound of the formula

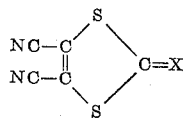

where X is oxygen or sulfur, at a temperature in the range of 500 to 1200° C., the internal pressure in the pyrolysis system being in the range of about 0.1 to 1500 mm. of mercury but below 200 mm. of mercury when the pyrolysis temperature exceeds 650° C.

The starting materials used in this process are known compounds. They are both derived from disodium dimercaptomaleonitrile,

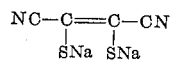

which in turn is readily prepared from sodium cyanide and carbon disulfide as described by Bähr and Schleitzer in Ber., 90, 438 (1957), or by the modified procedure described in German Patent 1,158,056.

4,5-dicyano-1,3-dithiole-2-one,

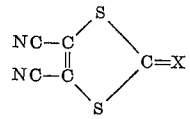

which is the preferred starting material both because it is the most economical to prepare and because it gives excellent results in the synthesis of dicyanoacetylene, may be prepared by reaction of phosgene with disodium dimercaptomaleonitrile as described in U.S. Patent 3,140,295. In this work, it was prepared by the same reaction but using the procedure of British Patent 829,529. The overall yield of crude 4,5-dicyano-1,3-dithiole-2-one (M.P. 118–120° C.) based on the initial sodium cyanide, was 53%. The product can be purified by sublimation and recrystallization, after which it melts at 126–127° C., but this operation is not necessary as the crude material can be pyrolyzed with very good results, as will be shown in one of the examples which follow.

4,5-dicyano-1,3-dithiole-2-thione,

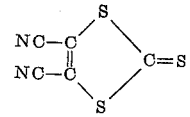

a solid melting at 125° C., can be prepared as described in either of the two references mentioned above.

On pyrolysis, these materials give, in addition to dicyanoacetylene, by-products such as carbon monoxide, carbon oxysulfide, sulfur, or carbon disulfide, which, except for the last named, have no tendency to react with dicyanoacetylene. Carbon disulfide reacts slowly at room temperature, but, under normal operating conditions, this side reaction causes only a very small yield loss.

The pyrolysis is conveniently conducted by passing the vaporized starting material through a reaction zone heated to a temperature of at least 500° C. The upper limit of pyrolysis temperature is determined by the thermal stability of dicyanoacetylene. It should not exceed about 1200° C., and in general there is no advantage in operating above about 1000° C. In the lower temperature range of 500–650° C., dicyanoacetylene is sufficiently stable that the pyrolysis can be carried out at atmospheric pressure, i.e., with a relatively long residence time, e.g., up to 20–30 seconds, in the hot zone. In this case, it is desirable to use an inert carrier gas, such as nitrogen, argon or helium, to drive the vapors of starting material and reaction product through the pyrolysis zone, and when this is done the pressure within the system may be somewhat above atmospheric, e.g., of the order of 1.5 to 2 atmospheres, i.e., up to about 1500 mm. of mercury, depending on the pressure of the carrier gas and the design of the equipment. At temperatures exceeding about 650° C., good yields of dicyanoacetylene are obtained only if it is removed quickly from the hot reaction zone, which is most conveniently done by application of reduced pressure, below about 200 mm. of mercury and preferably as low as is practically possible. Reduced pressure can, of course, be used also when the temperature is in the 500–650° C. range although, in this case, the yields become poorer below about 600° C. Since the yields are also rather low when operating at atmospheric or somewhat higher pressure in the lower temperature range, the preferred operating conditions are a pyrolysis temperature of 600–1000° C. and an internal pressure of 0.1 to 10 mm. of mercury.

The form of the pyrolysis apparatus and the material of which it is constructed are not critical. Conveniently, the pyrolysis zone is a tube made of any suitable heat-resistant material such as quartz, copper, nickel, stainless steel, copper-nickel alloys, and the like.

The presence of a contact material in the pyrolyzer is not essential but it does facilitate the reaction. For this purpose, there may be used any inert, heat-resistant material having a non-alkaline, i.e., neutral to acidic reaction, examples of which are quartz, silica gel, Carborundum, sand, porcelain, diatomaceous earth, and the like. The state of division of the contact material is not critical. Thus, it may be in the form of coarse fragments or of relatively fine particles, e.g., in the 100–200 mesh range.

In the preferred mode of operation, the starting material is vaporized, for example, by sublimation or by injection into a stream of preheated carrier gas, and the vapors are introduced into the pyrolyzer previously brought to reaction temperature. The gaseous pyrolyzate leaving the reaction zone is then passed through one or more cold receivers where the dicyanoacetylene, unreacted starting material, if any, and condensable by-products are collected. When as is the preferred practice, the operation is conducted under reduced pressure, the system is connected through the cold receivers to a vacuum pump. Dicyanoacetylene (B.P. 76–76.5° C.; M.P. 20–21° C.) can be separated from the crude pyrolyzate by the usual methods of fractional distillation, or by trap-to-trap distillation when working on a small scale. It can also be isolated by a gas-liquid partition process, e.g., gas phase chromatography. The process can readily be adopted to continuous or semi-continuous operation.

The following examples illustrate the invention.

*Example 1*

In this example, the starting material was purified 4,5-dicyano-1,3-dithiole-2-one (M.P. 126–127° C.). The pyrolysis was carried out in a 25 x 2 cm. vertical quartz tube filled with 20–35 mesh quartz chips. The lower end of the tube was attached to a flask containing the starting material and immersed in a hot air bath. The upper end of the tube was connected to two traps in series, the first cooled with a Dry Ice/acetone mixture and the second cooled with liquid nitrogen. The second trap was connected to a vacuum pump.

With the pyrolysis tube temperature at 700° C. and the pressure in the system 0.3 mm., the air bath surrounding the flask was brought up to 100–140° C. and 2.883 g. of 4,5-dicyano-1,3-dithiole-2-one was sublimed through the tube during a period of about 4 hours. The pressure increased to 0.9 mm. during the pyrolysis. The condensate in the second trap consisted chiefly of carbon disulfide and carbonyl sulfide. The condensate in the first trap, which contained the dicyanoacetylene and some sulfur, was subjected to a trap-to-trap distillation under reduced pressure to give 0.976 g. of dicyanoacetylene, which was found by gas phase chromatography to contain about 5% of carbon disulfide. The dicyanoacetylene, obtained in 71% conversion and yield, was identified by infrared spectroscopy.

*Example 2*

In this example, the starting material was crude 4,5-dicyano-1,3-dithiole-2-one (M.P. 118–120° C.). The apparatus and procedure were the same as in Example 1, except that the pyrolysis tube was filled with quartz tubes, 0.5 cm. in diameter, cut into pieces of 0.5 cm. length, and the tube was heated to 800° C. In the course of 5 hours, 49.3 g. of the crude starting material was sublimed into the tube (subliming bath temperature 100–160° C.). The pressure in the system varied from 1.0 to 5.0 mm. The condensate in the first trap was subjected to trap-to-trap distillation to give 12.5 g. (56% yield) of pure dicyanoacetylene, analyzed by gas phase chromatography.

Another preparation under the same conditions except that 72.6 g. of crude 4,5-dicyano-1,3-dithiole-2-one was pyrolyzed during 10 hours, gave a condensate which, after one trap-to-trap distillation under reduced pressure, was found by gas phase chromatography to be 99.4% pure dicyanoacetylene. The yield was 20.6 g. (63%).

*Example 3*

The starting material in this example was 4,5-dicyano-1,3-dithiole-2-thione. The apparatus and procedure were the same as in Example 1 except that the temperature of the pyrolysis tube was 650° C. At a subliming bath temperature of 100–160° C. and a pressure in the system of 0.2 mm., 1.625 g. of 4,5-dicyano-1,3-dithiole-2-thione was sublimed into the tube in three hours. There was obtained 0.310 g. of condensate, which, by gas phase chromatography, was found to contain 54% of carbon disulfide and 42% (19% yield) of dicyanoacetylene. The latter was identified by infrared spectroscopy.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing dicyanoacetylene which comprises pyrolyzing in the vapor phase a compound of the formula

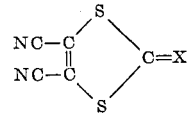

where X is a member of the class consisting of oxygen and sulfur, at a temperature in the range of 500 to 1200° C., the internal pressure in the pyrolysis system being in the range of about 0.1 to 1500 mm. of mercury, with the proviso that when the pyrolysis temperature exceeds 650° C. the internal pressure is below 200 mm. of mercury.

2. Process for preparing dicyonoacetylene which comprises pyrolyzing 4,5-dicyano-1,3-dithiole-2-one at a temperature of from 600 to 1000° C. and an internal pressure of 0.1 to 10 mm. Hg.

3. Process for preparing dicyanoacetylene which comprises pyrolyzing 4,5-dicyano-1,3-dithiole-2-thione at a temperature of from 600 to 1000° C. and an internal pressure of 0.1 to 10 mm. Hg.

4. Process of claim 1 in which the pyrolyis is conducted by passing vaporized starting material into a stream of preheated inert carrier gas and introducing the vapors into a pyrolysis zone preheated to at least 500° C.

5. Process of claim 1 in which an inert, heat-resistant, non-alkaline reactive material is present as a contact material in the pyrolysis zone.

6. Process for preparing dicyanoacetylene which comprises pyrolyzing in the vapor phase a compound of the formula

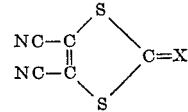

where X is a member of the class consisting of oxygen and sulfur, at a temperature in the range of from 500 to 650° C., an internal pressure of from 1 to 2 atmospheres, and in the presence of an inert carrier gas, the residence time in the pyrolysis zone being up to 30 seconds, and collecting from the resultant gaseous pyrolyzate dicyanoacetylene.

No references cited.

CHARLES B. PARKER, *Primary Examiner.*

JOSEPH P. BRUST, *Assistant Examiner.*

UNITED STATES PATENT OFFICE
CERTIFICATE OF CORRECTION

Patent No. 3,322,816                  May 30, 1967

Engelbert Ciganek et al.

It is hereby certified that error appears in the above numbered patent requiring correction and that the said Letters Patent should read as corrected below.

Column 1, lines 65 to 70, the structural formula should appear as shown below instead of as in the patent:

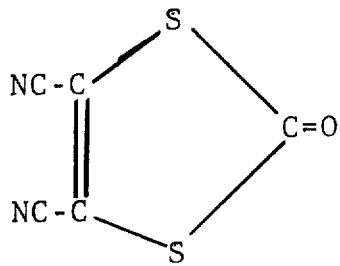

column 4, line 34, for "dicyonoacetylene" read -- dicyanoacetylene --.

Signed and sealed this 1st day of October 1968.

(SEAL)
Attest:

EDWARD M. FLETCHER, JR.           EDWARD J. BRENNER
Attesting Officer                 Commissioner of Patents